United States Patent [19]

Shirasaki

[11] Patent Number: 5,578,887

[45] Date of Patent: Nov. 26, 1996

[54] VIBRATION ACTUATOR

[75] Inventor: Takayuki Shirasaki, Yokohama, Japan

[73] Assignee: Canon Kabushiki Kaisha, Tokyo, Japan

[21] Appl. No.: 428,516

[22] Filed: Apr. 25, 1995

[30] Foreign Application Priority Data

Apr. 27, 1994 [JP] Japan .................................. 6-089719

[51] Int. Cl.⁶ .................................................. H01L 41/08
[52] U.S. Cl. ................................................ 310/323
[58] Field of Search ................................ 310/323, 328

[56] References Cited

U.S. PATENT DOCUMENTS

| | | | |
|---|---|---|---|
| 5,034,646 | 7/1991 | Shirasaki | 310/323 |
| 5,053,669 | 10/1991 | Saeki et al. | 310/323 |
| 5,107,163 | 4/1992 | Umemura et al. | 310/323 |
| 5,148,075 | 9/1992 | Shirasaki | 310/323 |
| 5,172,023 | 12/1992 | Kawai et al. | 310/323 |
| 5,329,201 | 7/1994 | Shirasaki | 310/323 |
| 5,352,950 | 10/1994 | Shirasaki | 310/323 |
| 5,363,006 | 11/1994 | Yano et al. | 310/323 |
| 5,406,160 | 4/1995 | Shirasaki | 310/323 |
| 5,440,191 | 8/1995 | Takagi | 310/323 |
| 5,448,129 | 9/1995 | Sumihara et al. | 310/323 |

*Primary Examiner*—Mark O. Budd
*Attorney, Agent, or Firm*—Fitzpatrick, Cella, Harper & Scinto

[57] ABSTRACT

A vibration actuator including a ring-like vibration member for generating a vibration and a ring-like contact member having a contact portion which is in contact with the vibration member. The contact member and the vibration member are moved relative to each other rotated by the vibration of the vibration member. The contact member has a first portion between the contact portion and an inner portion. The thickness of the first portion is gradually reduced with respect to the contact portion and the inner portion.

29 Claims, 6 Drawing Sheets

VIBRATION ACTUATOR

BACKGROUND OF THE INVENTION

1. Field of the Invention

The present invention relates to a vibration actuator for moving a vibration member and a contact member relative to each other by vibrations.

2. Related Background Art

A vibration motor in a prior art will be described with reference to FIGS. 5A to 7C.

FIGS. 5A to 5D are views showing the structure of a vibration motor proposed by the present inventor.

Figure 5A:
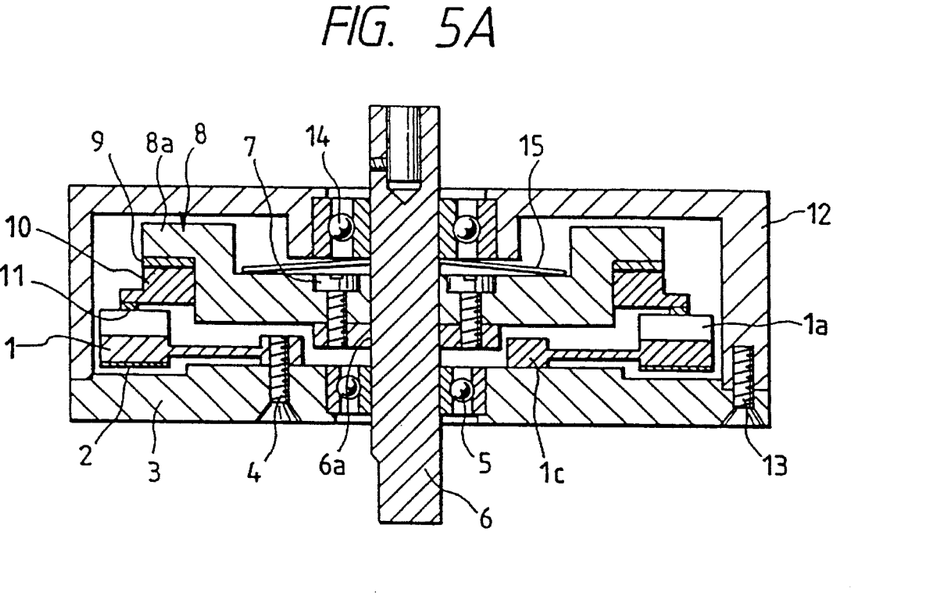
FIG. 5A is a longitudinal sectional view of a conventional vibration motor.
Figure 5B:
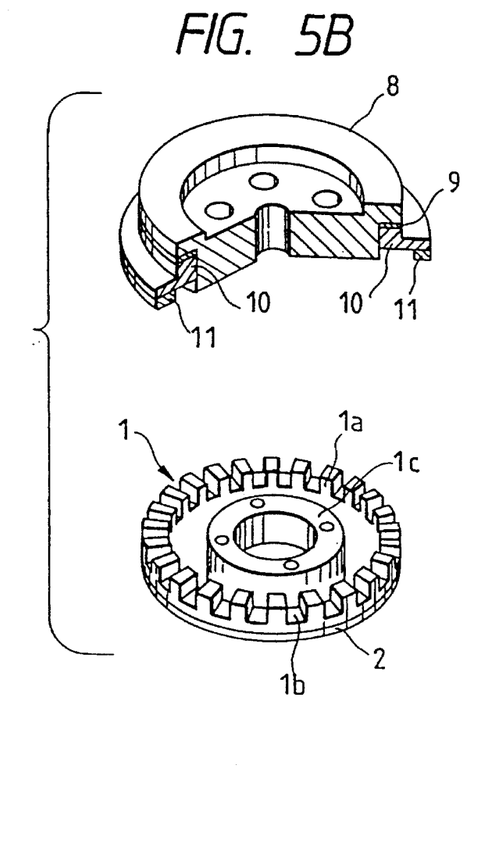
FIG. 5B is an exploded perspective view showing a vibration member, a moving member, and an intermediate member of the conventional vibration motor.

Referring to FIG. 5A, a vibration member 1 serves as a power generation source of the vibration motor. The vibration member 1 has a shape shown in FIG. 5B and is fastened and fixed to a motor end plate 3 by screws 4 at a central boss portion 1c. The vibration member 1 is made of stainless steel. A large number of radial slits 1b are formed in the peripheral edge of one end face of the vibration member 1 to define a large number of tooth-like projections 1a, as shown in FIG. 5B. An annular piezoelectric element 2 is adhered and fixed to the other end face of the vibration member 1 so as to correspond to the annular portion on which the tooth-like projections 1a are formed. A flexible printed board (not shown) for applying a drive voltage to the piezoelectric element is adhered to the piezoelectric element 2.

A bearing 5 is fixed at the center of the motor end plate 3, and a rotating shaft 6 is rotatably supported in the bearing 5. A motor case 12 having the other end plate portion is fixed to the motor end plate 3 by screws 13, and the rotating shaft 6 is also rotatably supported in a bearing 14 fixed to the end plate portion of the motor case 12. A flange 6a mounted on the rotating shaft 6 by shrink-fit or the like is disposed between the bearings of the rotating shaft 6. An intermediate member 8 serving as a support member shown in FIG. 5B is fixed to the flange 6a by screws 7, so that the intermediate member 8 rotates together with the rotating shaft 6. The intermediate portion 8 has a peripheral flange 8a facing the tooth-like projections 1a of the vibration 1, as shown in FIG. 5B. An annular aluminum alloy support member 10 for supporting a slide member is attached to the end face (i.e., an end face facing the tooth-like projections 1a of the vibration member 1) of the peripheral flange portion 8a through an annular, elastic rubber sheet member 9.

Figure 5C:
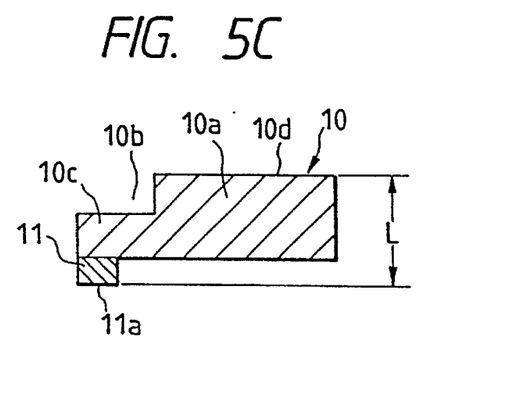
FIG. 5C is an enlarged sectional view of one half of the moving member.

As shown in FIG. 5C, the support member 10 comprises a base portion 10a fixed to the flange portion 8a of the intermediate member 8, a stepped portion 10b circumferentially formed along the peripheral edge of the base portion 10a, and an annular flange portion 10c extending outward from the flange portion 8a. An annular slide member 11 made of a composite resin is adhered to the surface of the flange portion 10c, which faces the vibration member 1. The slide member 11 is pressed against the tooth-like projections 1a of the vibration member 1 and moved relative to the tooth-like projections 1a by the friction therebetween in accordance with circumferential traveling wave vibrations produced in the tooth-like projections 1a. As a result, the intermediate member 8 is rotated through the support member 10.

Note that a member obtained by coupling the slide member 11 and the support member 10 is called a moving member herein.

Figure 5D:
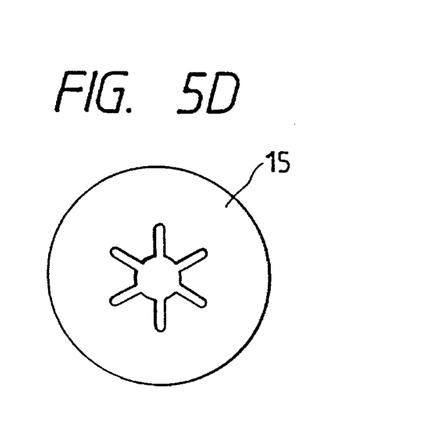
FIG. 5D is a plan view of a compression spring mounted in the vibration motor.
Figure 6:
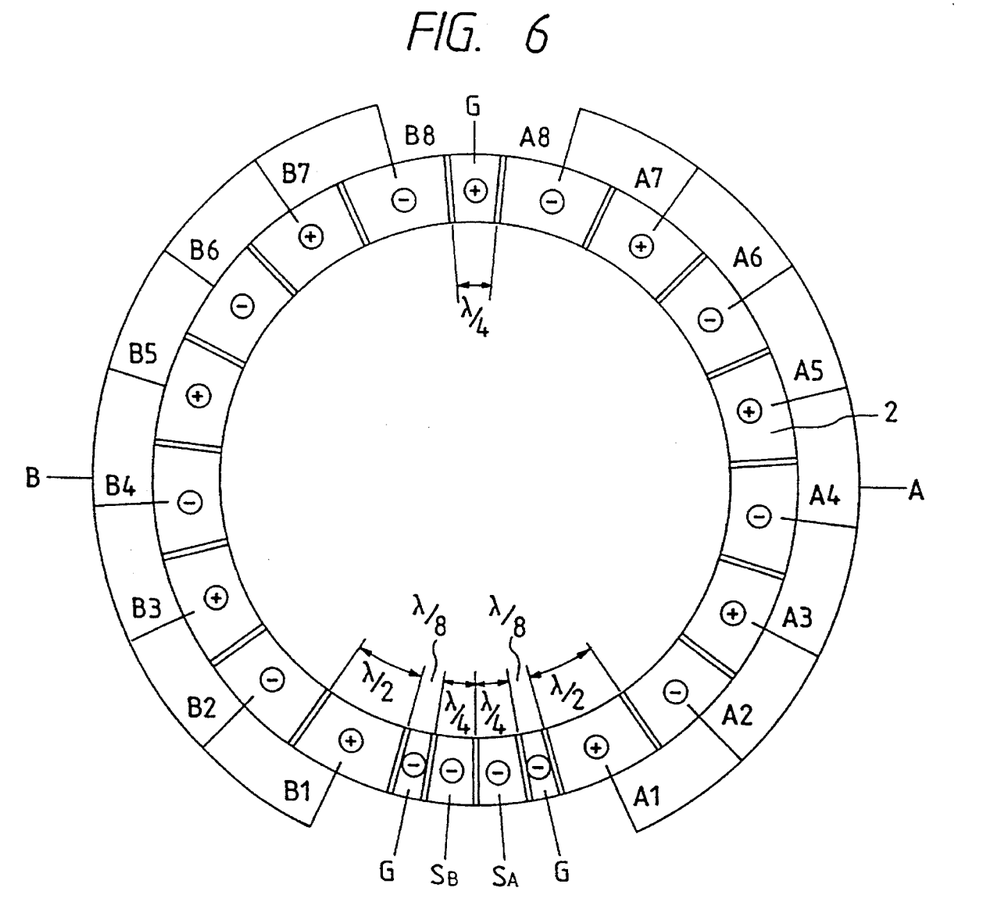
FIG. 6 is a view showing the arrangement of polarized regions on the lower surface of the vibration member of the vibration motor in FIG. 5A and the arrangement of electrodes formed on these regions.

A conical compression spring 15 brings the slide member 11 into tight contact with the tooth-like projections 1a of the vibration member 1. The conical compression spring 15 has a planar shape, as shown in FIG. 5D. The conical compression spring 15 is disposed between the bearing 14 and the intermediate member 8 to bias the intermediate member 8 toward the vibration member 1.

The slits 1b and the tooth-like projections 1a of the vibration member 1 and the electrode arrangement of the piezoelectric element 2 will be described with reference to FIGS. 6 and 7A to 7C.

Figure 7A:
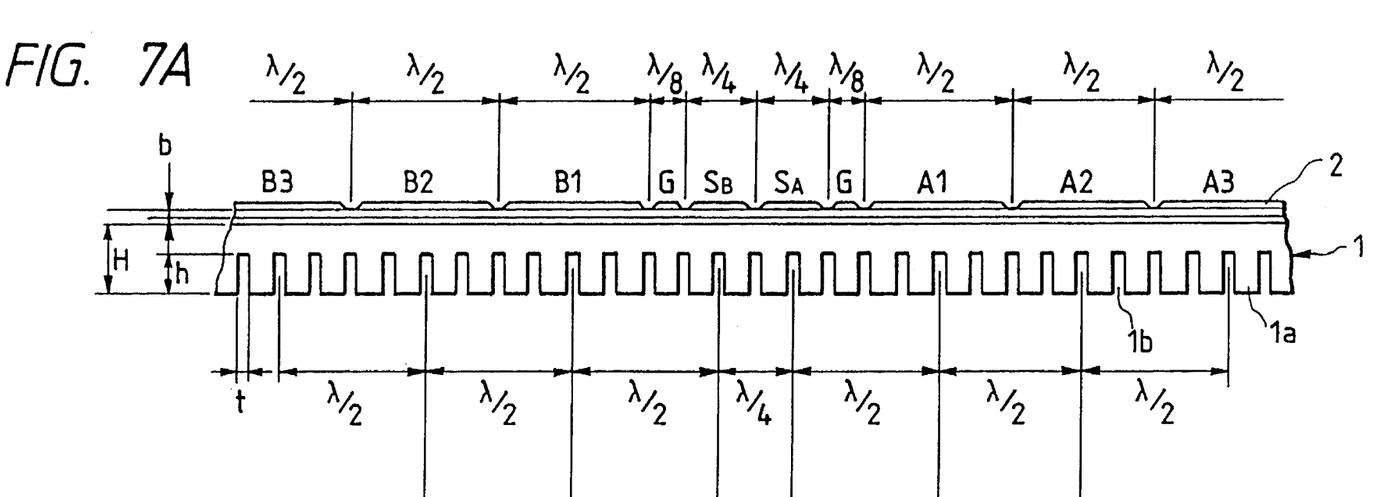
FIGS. 7A to 7C are side views of the vibration member of the vibration motor in FIGS. 1, 3 and 5A to 5D and a view showing standing wave vibrations produced in the vibration member.
Figure 7B:
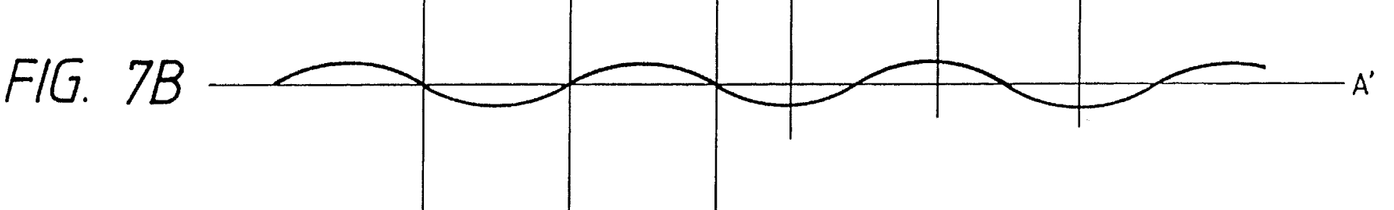
Figure 7C:
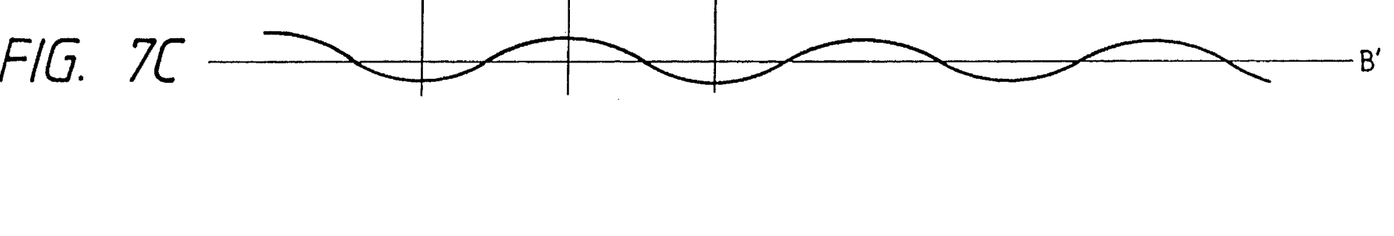

The annular piezoelectric element 2 is adhered to the lower surface (i.e., the surface without the tooth-like projections 1a) of the vibration member 1 in correspondence with the arrangement position of the tooth-like projections 1a. Eight regions having the same length and polarized alternately in opposite directions are formed along one half of the circumference of the piezoelectric element 2, and eight regions polarized alternately in opposite directions are also formed along the other half of the circumference of the piezoelectric element 2. Electrodes A1 to A8 and electrodes B1 to B8 are formed on the surfaces of the respective regions. The distance between the centers of the adjacent ones of the electrodes A1 to A8 and B1 to B8, i.e., the pitch between the centers of the adjacent polarized regions is ½ the wavelength $\lambda$ ($\lambda/2$) of the circumferential standing wave vibration produced in the tooth-like projections 1a. The center of each region, i.e., the center of each electrode coincides with the position of one slit 1b. The vibration member 1 and the piezoelectric element 2 are adhered to each other such that four tooth-like projections are located between the center of each electrode and the center of its adjacent electrode. When a first AC voltage A is applied to the electrodes A1 to A8 arranged along the first half of the circumference, a first standing wave vibration A' is generated along the tooth-like projections 1a of the vibration member 1, as shown in FIGS. 7A to 7C. When an AC voltage B phase-shifted by 90° from the first AC voltage is applied to the electrodes B1 to B8 arranged along the other half of the circumference, a second standing wave vibration B' is generated along the tooth-like projections 1a.

The electrode A1 is phase-shifted from the electrode B1 by $3\lambda/4$. In this region corresponding to $3\lambda/4$, two polarized regions each having a circumferential length of $\lambda/4$ and two polarized regions each having a circumferential length of $\lambda/8$ are formed on the piezoelectric element 2. These four regions are negatively polarized on the surface of the piezoelectric element 2. Ground electrodes G are formed in the two regions which are respectively adjacent to the electrodes A1 and B1 and each of which has a circumferential length of $\lambda/8$. A first detection electrode $S_A$ for detecting the first vibration occurring in the vibration member 1 by the first AC voltage and a second detection electrode $S_B$ for detecting the second vibration occurring in the vibration member 1 by the second AC voltage are formed in the two regions $\lambda/4$ long in the circumferential direction between the two regions in which the ground electrodes G are formed. The centers of the two detection electrodes $S_A$ and $S_B$ i.e., the centers of the polarized regions in which the detection electrodes are formed are arranged to match the corresponding slits 1b of the vibration member 2, respectively. The central position of the detection electrode $S_A$ matches the antinode position of the first standing wave vibration A', and the central position of the electrode $S_B$ matches the antinode position of the second standing wave vibration B'.

On the other hand, a region having a circumferential length of $\lambda/4$ is present between the electrodes A8 and B8. This region is polarized positively on the surface of the piezoelectric element 2, and at the same time, a ground electrode G is formed on the surface of this region.

The annular portion of a flexible printed board (not shown) is adhered to the surface portions of the piezoelectric element which are polarized as described above and have the electrodes thereon. The respective electrodes of the piezoelectric element are pressed against the corresponding electrodes formed on the board, so that an external control circuit and a power supply are electrically connected to the piezoelectric element 2 through the board.

The axial thickness of the vibration member 1 is represented by H in FIG. 7A, and the depth of each slit 1b is represented by h. The width of each slit 1b is t, and the overall thickness (i.e., the thickness including the electrode film) of the piezoelectric element 2 is b.

The characteristics required of the vibration motor are shown in Table 1 below.

TABLE 1

| (Required Characterestics) | |
| --- | --- |
| Rated Value | 8 kg · cm or more at 22.5 rpm |
| Accuracy of Rotation | 0.03% or less at 33.3 rpm and a torque of 1 kg · cm, using a laser rotary encoder (81,000 PPR) |
| Service Life | 2,000 hours |

TABLE 2

| (Main Design Specifications) (Unit: mm) | | |
| --- | --- | --- |
| Piezoelectric Element | Material | Tokin N-61 |
| | Size | 73 (outer diameter) × 57 (inner diameter) × .05 (thickness) |
| | Electrode | Wave number: 9, vibration detection electrode count: 2 |
| Vibration Member | Material | Martensite-based stainless steel, SUS420J2 |
| | Size | 73 (outer diameter) × 57 (inner diameter) × 6.5 (thickness) |
| | Slit | Number: 72, width: 1, depth: 3.5 |
| | Hardening | Ni-P-PTFE (2.5 wt %) alloy film*[1] product heat-treated at 300° C., $H_v = 800$ |
| Member for Supporting Slide Member | Material | Aluminum alloy 5056 |
| | Size | Thickness of flange portion: 1.5, length: 3 |
| Slide Member | Material | Composite resin $H_RM = 80$ to 110 |
| | Size | 68 (outer diameter) × 65 (inner diameter) × 1 (thickness) |
| | Axial Load | 15 kgf |

*[1]Fluoroplastic eutectoid electroless nickel: Nippon Kanizen, Kanifuron B

Table 2 shows the main design specifications of the vibration motor. An evaluation test of the vibration motor of the prior art was conducted in accordance with the required characteristics, but the following unsatisfactory results were obtained. When the T-N characteristics (torque-rotational speed characteristics) of the motor were measured at a large vibration amplitude at which "sound noise" did not occur, the following results were obtained.

(1) Although the rating of the required characteristics was satisfied, a sufficient margin was not assured, and the torque did not increase sufficiently.

(2) Disturbances occurred in the T-N characteristics at high amplitudes.

(3) Ripples often occurred in a high-torque range.

SUMMARY OF THE INVENTION

One aspect of the invention is a vibration actuator having a vibration member and a contact member contacting the vibration member, wherein a connecting portion whose thickness gradually changes is formed between a base portion and a contact portion of the contact member contacting with the vibration member.

DETAILED DESCRIPTION OF THE PREFERRED EMBODIMENTS

Preferred embodiments of the present invention will be described with reference to FIGS. 1 to 4B.

FIRST EMBODIMENT

Figure 1:
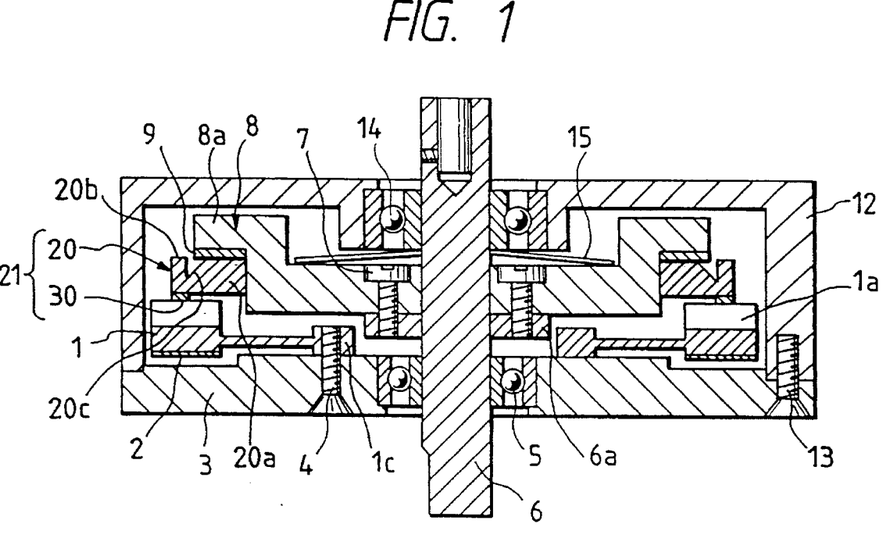
FIG. 1 is a longitudinal sectional view of a vibration motor according to the first embodiment of the present invention.

FIG. 1 is a longitudinal sectional view of a vibration motor to which the present invention is applied. The vibration motor of this embodiment is the same as the conventional vibration motor except for a moving member mounted on a member for supporting a moving member, and the arrangements of the respective parts will be briefly described below.

Referring to FIG. 1, the vibration motor comprises a vibration member 1, a piezoelectric element 2, a motor end plate 3, fastening screws 4 and 7, an intermediate member 8, an elastic rubber sheet member 9, a motor case 12, a fastening screw 13, bearings 5 and 14, a compression spring 15, a rotating shaft 6, a flange 6a fixed to the rotating shaft 6 by shrink-fit or the like, and a moving member 21 consisting of a slide member 30 and a support member 20 for supporting the slide member 30.

The annular support member 20 is fixed to a peripheral flange portion 8a of the intermediate member 8 through the elastic rubber sheet member 9. The annular slide member 30 is fixed to the peripheral portion of the first end face (i.e., the surface facing the vibration member 1) of the support member 20.

The present inventor made five moving member samples including the moving member 21 shown in FIG. 1 as the moving member to be mounted in the vibration motor shown in FIG. 1, and fabricated five vibration motors mounting these moving member samples.

FIGS. 2A to 2E are enlarged sectional views of halves of five different moving member samples to be mounted in the vibration motor (this motor has the same structure as the conventional vibration motor except for only the moving member).

Figure 2A:
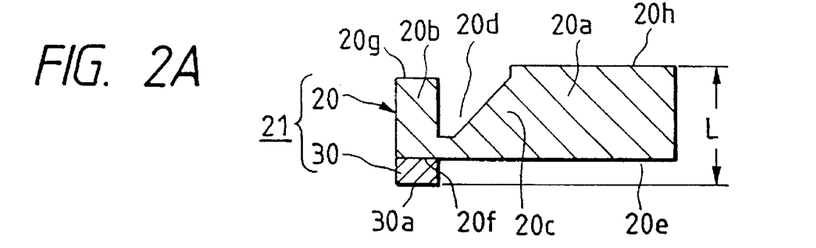
FIG. 2A is a enlarged sectional view of one half of a first moving member mounted in the vibration motor shown in FIG. 1.

As shown in FIG. 2A, a support member 20 of the first moving member 21 mounted in the vibration motor of the present invention comprises an annular base portion 20a fixed to the flange portion 8a of the intermediate member 8, a cylindrical slide member mounting portion 20b to which the slide member 30 is fixed, and a flexible connecting portion 20c for connecting the base portion 20a and the slide member mounting portion 20b. A circumferential groove 20d having a generally triangular cross-section is formed in the second surface (i.e., the end face not facing the vibration member 1) of the connecting portion 20c. The depth of the groove 20d gradually increases and the wall thickness of the connecting portion 20c gradually decreases as the connecting member 20c is separated farther from the axis of the rotating shaft 6. A surface 20e of the support member 20, which faces the vibration member is located at the same axial position as that of a slide member mounting surface 20f of the slide member mounting portion 20b. Therefore, the surface 20e has the same level as that of the surface 20f.

The connecting portion 20c serves as a spring which elastically flexes in the axial direction (vertical direction in FIGS. 2A to 2E). The spring force of the connecting portion 20c is applied to the contact portion between the slide member 30 and the vibration member 1 in addition to the spring force of the compression spring 15. For this reason, the slide member 30 can properly follow vibrations of tooth-like projections 1a of the vibration member 1. As a result, The vibration motor of the present invention has better characteristics than those of the conventional vibration motor. Note that the spring function can greatly enhance the performance of the vibration motor since the wall thickness of the connecting portion 20c (i.e., the depth of the groove 20d) is gradually changed.

Figure 2B:
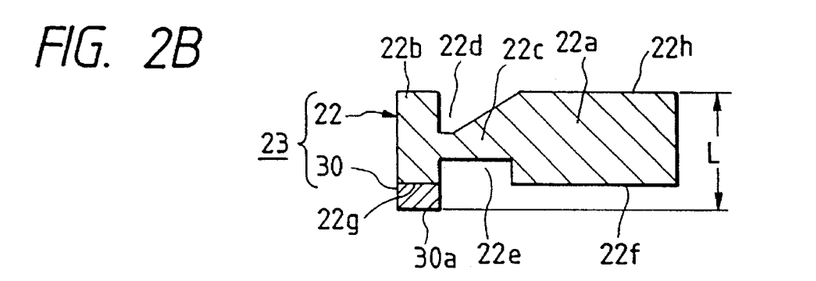
FIG. 2B is a sectional view of a second moving member mounted in the vibration motor shown in FIG. 1.

A support member 22 for supporting a slide member in a second moving member 23 shown in FIG. 2B comprises an annular base portion 22a fixed to the flange portion 8a of the intermediate member 8, a cylindrical slide member mounting portion 22b to which a slide member 30 is fixed, and a flexible connecting portion 22c for connecting the base portion 22a and the mounting portion 22b. A triangular circumferential groove 22d which becomes deeper outward in the radial direction is formed in the end face of the connecting portion 22c, which is opposite to the vibration member. A rectangular groove 22e having a predetermined depth is formed in the connecting portion surface opposing the vibration member. The wall thickness of the connecting portion 22c gradually decreases from the inner side to the outer side of the support member 22. In the support member 22 of this embodiment, since the groove 22e is also formed in the end face facing the vibration member 1, flexibility of the connecting portion 22c can be further enhanced than the support member 20 of the first embodiment, thereby further enhancing the spring effect of the connecting portion 22c. For this reason, the slide member 30 can properly follow vibrations of the tooth-like projections 1a of the vibration member 1. As a result, the groove 22e contributes to stabilization of the T-N characteristics of the motor. Note that an end face 22f of the base portion 22a of the support member 22 on the vibration member side is located at the same axial location as that of an end face 22g of the slide member mounting portion 22b on the vibration member side.

Figure 2C:
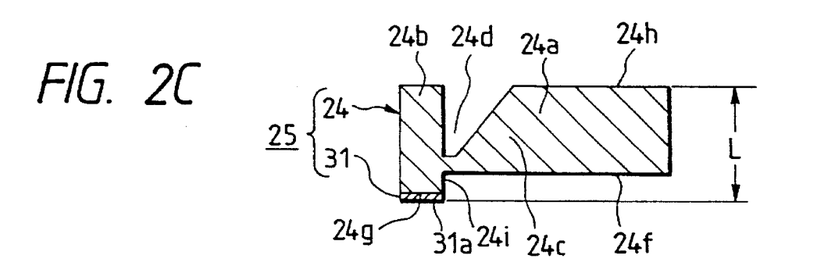
FIG. 2C is a sectional view of a third moving member mounted in the vibration motor shown in FIG. 1.

A third moving member 25 shown in FIG. 2C is arranged to use a slide member 31 having a thickness smaller than that of the slide member 30. A support member 24 for supporting a slide member in the moving member 25 comprises an annular base portion 24a fixed to a flange portion 8a of an intermediate portion 8, a cylindrical slide member mounting portion 24b to which a slide member 31 is fixed, and a flexible connecting portion 24c for connecting the base portion 24a and the slide member mounting portion 24b. A circumferential groove 24d having a triangular cross-section which becomes gradually deeper outward along the radial direction is formed in the end face of the support member 24, which is opposite to the vibration member 1, thereby constituting the connecting portion 24c. The wall thickness (axial size) of the connecting portion 24c is set to gradually decrease from the base portion 24a to the slide member mounting portion 24b. A step 24i is formed between an end face 24f of the base portion on the vibration member side and a slide member mounting surface 24g. The end face 24f of the base portion 24a is spaced apart from the vibration member 1 by this step.

Figure 2D:
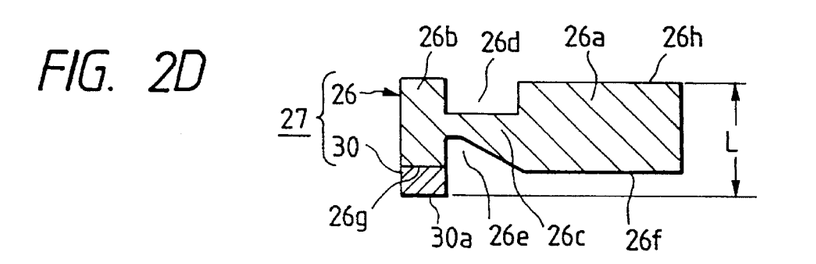
FIG. 2D is a sectional view of a fourth moving member mounted in the vibration motor shown in FIG. 1.

A fourth moving member 27 shown in FIG. 2D is arranged to use a thick slide member 30a as in the moving members 21 and 23. A support member 26 for supporting a slide member comprises a base portion 26a fixed to the intermediate portion 8, a cylindrical slide member mounting portion 26b to which a slide member 30 is fixed, and a flexible connecting portion 26c for connecting the base portion 26a and the mounting portion 26b. A circumferential groove 26e having a triangular cross-section which becomes gradually deeper outward in the radial direction is formed in a surface of the connecting portion, which faces the vibration member. A circumferential groove 26d which has a square cross-section and a predetermined depth is formed in the opposite end face of the connecting portion 26c. Note that in the support member 26, a slide member mounting surface 26g is located at the same axial direction as that of a surface 26f opposing the vibration member.

According to the moving member having the structure shown in FIG. 2D, the T-N characteristics of the vibration motor can be stabilized.

Figure 2E:
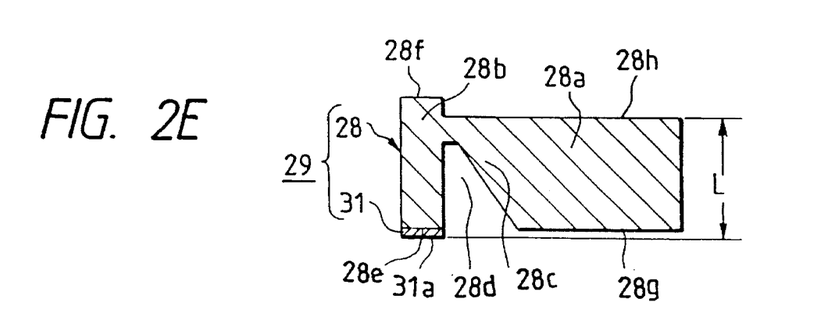
FIG. 2E is a sectional view of a fifth moving member mounted in the vibration motor shown in FIG. 1.

A fifth moving member 29 shown in FIG. 2E is arranged to use a thin slide member 31 as in the moving member 25. A support member 28 for supporting a slide member in this moving member 29 comprises an annular base portion 28a fixed to the intermediate member 8, a cylindrical slide member mounting portion 28b to which the slide member 31 is mounted, and a flexible connecting portion 28c for connecting the base portion 28a and the slide member mounting portion 28b. Unlike the moving members in FIGS. 2A and 2B, a circumferential groove 28d having a triangular cross-section is formed in the surface of the connecting portion 28c, which faces the vibration member. A surface 28h opposite to the surface opposing the vibration member has a step with respect to an end face 28f of the slide member mounting portion 28b. With this structure, an increase in torque of the vibration motor can be improved. Note that a surface 28g of the base portion 28a, which faces the vibration member has the same level as that of a slide member mounting surface 28e.

Table 3 shows the material compositions and Rockwell hardness values ($H_RM$) of the slide members 30 and 31 used in the moving members shown in FIGS. 2A to 2E.

TABLE 3

| | Slide Member | | |
|---|---|---|---|
| Slide Member | Resin Composition (wt %) | Reinforcing Material (wt %) | $H_RM$ |
| 30 | PEEK*[1] | Glassy carbon*[3] 30 | 90 |
| 31 | PTFE + POB*[2] | Glassy carbon*[3] 15 | 82 |

*[1]I.C.I.: Polyether ether ketone (Victrex)
*[2]SUMITOMO CHEMICAL CO., LTD.: Polyoxybenzoyl (Econol E101)
*[3]KANEBO, LTD.: Carbon microbeads (Bellpearl C2000)

In the five moving member samples shown in FIGS. 2A to 2E, an axial size L between the fixing surfaces 20h, 22h, 24h, 26h, and 28h of the respective support members with respect to the intermediate members 8 and the slide surfaces 30a and 31a of the slide members is set to coincide with a size L (i.e., the axial size between the base surface 10d of the support member 10 and the slide surface 11a of the slide member 11) of the conventional moving member shown in FIG. 5C.

Vibration motors having the same structure as in FIG. 1 were manufactured using the above five different moving member samples and tested in accordance with the required characteristics in Table 1, thereby obtaining the following results.

(1) When the vibration amplitude was increased at the rated rotational speed of 22.5 rpm, a rated torque of 8 kg·cm was obtained in all the moving member samples. When they were relatively evaluated at an identical amplitude amount, the moving member 21 in FIG. 2A and the moving member 29 in FIG. 2E had large torques.

(2) When stability of torques in a high-torque range was evaluated, disturbances of the T-N characteristics were small in the moving members 23, 25, and 27 in FIGS. 2B, 2C, and 2D.

(3) The ripples of the T-N characteristics at the rated value were almost equal to those of the conventional moving member.

SECOND EMBODIMENT

Figure 3:
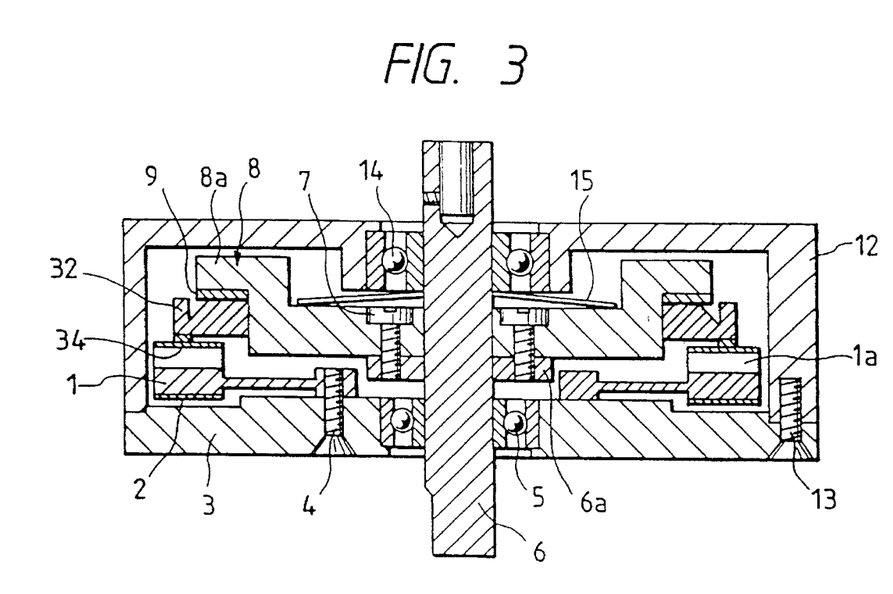
FIG. 3 is a longitudinal sectional view of a vibration motor according to the second embodiment of the present invention.
Figure 4A:
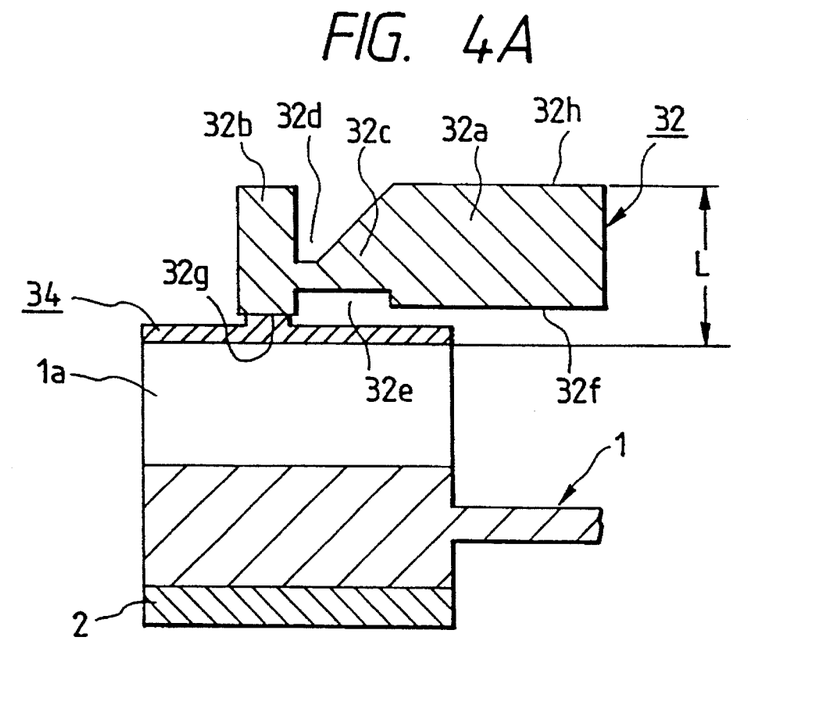
FIG. 4A is an enlarged view showing a first moving member and a first slide member, and part of a vibration member, which are mounted in the vibration motor shown in FIG. 3.
Figure 4B:
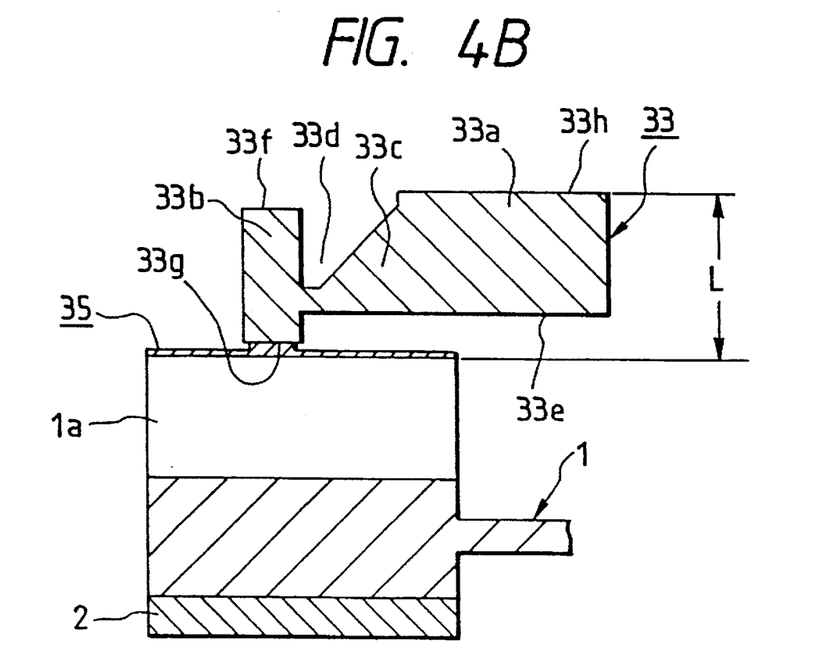
FIG. 4B is an enlarged view showing a second moving member and a second slide member, and part of a vibration member, which are mounted in the vibration motor shown in FIG. 3.

In the second embodiment of the present invention shown in FIGS. 3, 4A, and 4B, a slide member is mounted on the vibration member side to reduce the number of constituent components on the moving member side.

FIG. 3 is a longitudinal sectional view of a vibration motor of the second embodiment of the present invention, which has a moving member and a vibration member shown in FIGS. 4A and 4B. The vibration motor in FIG. 3 is the same as that of the vibration motor shown in FIG. 1 except for the moving member and the vibration member. The same reference numerals in FIG. 3 denote the same parts as in FIG. 1, and a detailed description thereof will be omitted.

The vibration motor shown in FIG. 3 has a moving member 32 and a vibration member 1 shown in FIG. 4A. The moving member 32 does not have a slide member like the ones shown in FIGS. 2A to 2E, but is constituted by only a portion corresponding to the support member for supporting the slide member shown in each of FIGS. 2A to 2E. The moving member 32 is made of an aluminum alloy as in the support members in FIGS. 2A to 2E. The moving member 32 comprises an annular base portion 32a adhered and fixed to a flange 8a of an intermediate member 8, a cylindrical slide portion 32b in sliding contact with tooth-like projections 1a of a vibration member 1, and a flexible connecting portion 32c for connecting the base portion 32a and the slide portion 32b. A fluoroplastic eutectoid nickel-phosphorus alloy film is formed on one end face, i.e., a slide contact surface 32g of the slide portion 32b, which is in sliding contact with the tooth-like projections 1a of the vibration member 1. This alloy film is heat-treated to have a Vicker's hardness of about 800. A circumferential groove 32e having a predetermined depth is formed in the surface of the connecting portion 32c, which faces the vibration member. A circumferential groove 32d which has a rectangular cross-section and becomes gradually deeper in the radial direction is formed in the opposite surface of the connecting portion 32c. For this reason, the axial wall thickness of the connecting portion 32c is gradually reduced outward in the radial direction. The connecting portion 32c serves as a spring which elastically flexes in the axial direction. A surface 32f of the base portion 32a, which faces the vibration member has a step with the slide contact surface 32g such that the surface 32f is slightly farther away from the surface of the vibration member 1 than the slide contact surface 32g of the slide portion 32b.

In the vibration motor of this embodiment, a slide made 34 made of the same composite resin as that of the slide member 30 in the above embodiment is formed on the surface of the tooth-like projections 1a of the vibration member 1. A portion (this portion is slightly thicker than the remaining portion, as shown in FIG. 4A) of the slide member 34 which is in contact with the slide contact surface 32g of the moving member 32 has a thickness of 0.7 mm. The surface of this contact portion has a Rockwell hardness (M scale) of 90, and this portion is made of a composite resin in which glassy carbon is mixed as a reinforcing material in PEEK as in the slide member.

FIG. 4B shows the same arrangement as the first moving member of the second embodiment incorporated in the vibration motor in FIG. 3. A second moving member 33 is made of an aluminum alloy as in the first moving member 32. The moving member 33 comprises an annular base portion 33a adhered and fixed to the flange 8a of the intermediate member 8, a cylindrical slide portion 33b in sliding contact with the tooth-like projections 1a of the vibration member 1, and a flexible connecting portion 33c for connecting the base portion 33a and the slide portion 33b. A fluoroplastic eutectoid nickel-phosphorus alloy film is formed on one end face, i.e., a slide contact surface 33g of the slide portion 33b, which is in sliding contact with the tooth-like projections 1a of the vibration member 1. This alloy film is heat-treated to have a Vicker's hardness of about 800. A circumferential groove 33d which has a rectangular cross-section and becomes gradually deeper in the radial direction is formed in the surface of the connecting portion 33c, which is opposite to the vibration member. For this reason, the base portion 33a and a surface 33e of the connecting portion 33c, which faces the vibration member are farther away from the surface of the vibration member 1 than the slide contact surface 33g of the slide portion 33b. An end face 33f opposite to the slide contact surface 33g has a step with an end face 33h of the base portion 33a such that the end face 33f comes closer to the vibration member than the end face 33h.

A slide member 35 made of the same material as that of the slide member 31 is fixed to the surface of the tooth-like projections 1a of the vibration member 1. A portion (this portion is slightly thicker than the remaining portion, as shown in FIG. 4B) of the slide member 35, which is in contact with the slide contact surface 33g of the moving member 33 has a thickness of 0.3 mm. The surface of this contact portion has a Rockwell hardness (M scale) of 82, and this portion is obtained such that a scribing sheet made of a composite resin of PTFE (fluoroplastic) and POB (polyoxybenzoyl) is punched, and the resultant structure is fixed to the surface of the tooth-like projections 1a.

In the embodiment shown in FIGS. 4A and 4B, the axial size between the base surfaces 32h and 33h of the moving members 32 and 33 and the surface (i.e., the surfaces to which the slide members 34 and 35 are respectively fixed) of the tooth-like projections 1a of the vibration members 1 is set to the axial size L of the conventional moving member in FIG. 5C.

Note that the alloy films formed on the slide contact surfaces 32g and 33g of the first and second moving members 32 and 33 shown in FIGS. 4A and 4B need not be fluoroplastic eutectoid nickel-phosphorus alloy films, but can be silicon carbide eutectoid nickel-phosphorus alloy films.

Two vibration motors having the moving members shown in FIGS. 4A and 4B were tested in accordance with the required characteristics shown in Table 1. These motors satisfied the rated values shown in Table 1, and stable T-N characteristics were also confirmed.

Since the connecting portion has a circumferential groove with a triangular cross-section, the follow-up characteristics are improved.

Figure 8:
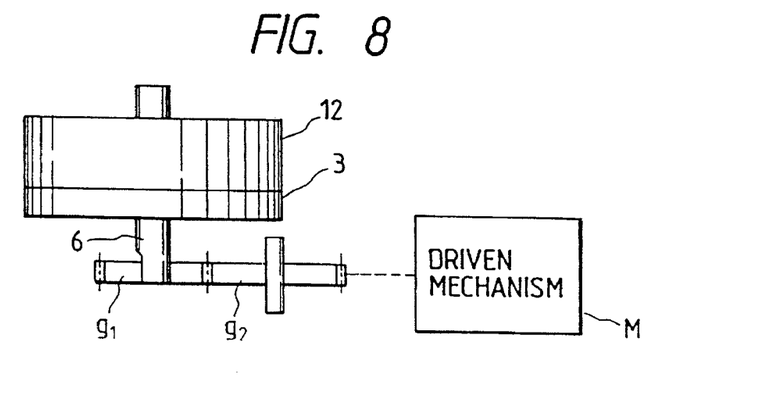
FIG. 8 is a view showing a system using the vibration motor of the present invention as a drive source.

FIG. 8 shows a system using the vibration wave motor shown in FIG. 1 or 3 as a drive source. Rotation is transmitted through a gear g1 fixed to the rotating shaft 6 and a gear g2 meshed with the gear g1, so that a driven mechanism M for moving, e.g., the carriage of a printer, is driven.

As has been described above, in the vibration motor of each embodiment described above, a connecting portion (its wall thickness is gradually reduced) having elasticity in the axial direction is formed between a base portion and a slide member mounting portion of a moving member or a slide portion. Therefore, the moving member properly follows the surface of the vibration member. As a result, a high-speed, high-torque operation can be performed as compared with a conventional structure. In particular, there is provided a vibration motor in which an increase in torque in a high-torque range is greatly improved to obtain a sufficient torque margin at the rated value, and stable characteristics can be obtained without disturbing the T-N characteristics in the high-torque range.

What is claimed is:

1. A vibration actuator comprising:

a vibration member for generating a vibration; and a contact member having a base portion, a contact portion and a first portion connecting said base portion and said contact portion, said first portion including a first groove having a cross-section with a substantially triangular shape, a thickness of said first portion being gradually reduced in a direction from said base portion to said contact portion, said contact portion being contacted to said vibration member, such that said contact member and said vibration member are moved relative to each other by vibration of said vibration member.

2. A vibration actuator comprising:

a vibration member for generating a vibration; and a contact member having a contact portion which is in contact with said vibration member, a base portion, and a first portion disposed between said contact portion and said base portion, said first portion including a first groove with a cross-section having a substantially triangular shape in one surface thereof and a second groove in the other surface thereof, such that a thickness of said first portion is gradually reduced in a direction from said base portion to said contact portion, said contact member and said vibration member being moved relative to each other by vibration of said vibration member.

3. An actuator according to claim 1, wherein said contact member comprises another member consisting of a material different from that of said contact portion, said other member being fixed to a part of said contact portion contacting said vibration member.

4. An actuator according to claim 2, wherein said contact member comprises another member consisting of a material different from that of said contact portion, said other member being fixed to a part of said contact portion contacting said vibration member.

5. An actuator according to claim 1, further comprising another member consisting of a material different from said vibration member, said other member being fixed to a part of said vibration member contacting said contact member.

6. An actuator according to claim 2, further comprising another member consisting of a material different from said vibration member, said other member being fixed to a part of said vibration member contacting said contact member.

7. An actuator according to claim 1, further comprising a spring member for urging said contact member against said vibration member.

8. A system for driving a driven mechanism using said vibration actuator of claim 1 as a drive source.

9. A vibration actuator comprising:

a ring-like vibration member for generating a vibration;

a ring-like contact member including an inner portion, a contact portion and a first portion connecting said inner portion and said contact portion, said first portion including a first groove having a cross-section with a substantially triangular shape, a thickness of said first portion being gradually reduced in a direction from said inner portion to said contact portion, said contact portion being contact to said vibration member, such that said contact member and said vibration member are rotated relative to each other by vibration of said vibration member.

10. A vibration actuator comprising:

a ring-like vibration member for generating a vibration;

a ring-like contact member including an inner portion, a contact portion and a first portion connecting said inner portion and said contact portion, said first portion including a first groove having a cross-section with a substantially triangular shape in one surface thereof and a second groove in the other surface thereof, a thickness of said first portion being gradually reduced in a direction from said inner portion to said contact portion, said contact portion being contacted to said vibration member, such that said contact member and said vibration member are rotated relative to each other by vibration of said vibration member.

11. An actuator according to claim 9 wherein said contact member comprises another member consisting of a material different from that of said contact portion, said other member being fixed to a part of said contact portion contacting said vibration member.

12. An actuator according to claim 10, wherein said contact member comprises another member consisting of a material different from that of said contact portion, said other member being fixed to a part of said contact portion contacting said vibration member.

13. An actuator according to claim 9, further comprising another member consisting of a material different from said vibration member, said other member being fixed to a part of said vibration member contacting said contact member.

14. An actuator according to claim 9, wherein said vibration member has a plurality of tooth-like projections on a contact portion of said vibration member contacting said contact member.

15. An actuator according to claim 9, further comprising a spring member for urging said contact member against said vibration member.

16. An actuator according to claim 9, wherein said vibration member is fixed, and said contact member is rotatable.

17. An actuator according to claim 16, further comprising a central axle rotated upon rotation of said contact member; and a ring-like intermediate member for transmitting rotation of said contact member to said central axle.

18. An actuator according to claim 17, further comprising a spring member for urging said contact member against said vibration member, said spring member being in contact with said intermediate member.

19. An actuator according to claim 9, wherein said first portion of said contact member has a thickness which is gradually reduced outward in a radial direction.

20. An actuator according to claim 10, wherein said first portion of said contact member has a first groove which is formed in one surface thereof and becomes gradually deeper outward in a radial direction, and a second groove which is formed in the other surface thereof and has a predetermined depth.

21. An actuator according to claim 19, wherein said vibration member is fixed, and said contact member is rotatable.

22. An actuator according to claim 20, wherein said vibration member is fixed, and said contact member is rotatable.

23. An actuator according to claim 21, further comprising:

a central axle rotated upon rotation of said contact member; and a ring-like intermediate member for transmitting rotation of said contact member to said central axle.

24. An actuator according to claim 23, further comprising a spring member for urging said contact member against said vibration member, said spring member being in contact with said intermediate member.

25. An actuator according to claim 22, further comprising:

a central axle rotated upon rotation of said contact member; and a ring-like intermediate member for transmitting rotation of said contact member to said central axle.

26. An actuator according to claim 25, further comprising a spring member for urging said contact member against said vibration member, said spring member being in contact with said intermediate member.

27. A system for driving a driven mechanism using said vibration actuator of claim 9 as a drive source.

28. A system for driving a driven mechanism using said vibration actuator of claim 23 as a drive source.

29. A system for driving a driven mechanism using said vibration actuator of claim 25 as a drive source.

* * * * *

UNITED STATES PATENT AND TRADEMARK OFFICE
CERTIFICATE OF CORRECTION

PATENT NO. : 5,578,887
DATED : November 26, 1996
INVENTOR(S) : TAKAYUKI SHIRASAKI It is certified that error appears in the above-indentified patent and that said Letters Patent is hereby corrected as shown below:

Column 3

Line 56, "An" should read --¶ An--.

Column 8

Line 35, "rectangular" should read --generally triangular--.

Column 9

Line 12, "member" should read --member,--.

Column 10

Line 67, "contact" should read --contacted--.

Column 11

Line 18, "claim 9" should read --claim 9,--.

Signed and Sealed this

Twentieth Day of May, 1997

Attest:

BRUCE LEHMAN

*Attesting Officer*     *Commissioner of Patents and Trademarks*